INVENTORS
HONORE MARCEL BAYARD
RAYMOND JACQUES CHARLES ROQUET
BY
Adams + Bush
ATTORNEYS Sept. 19, 1950 H. M. BAYARD ET AL 2,522,739

CORRECTING DEVICE FOR TELEGRAPH SIGNALS

Filed Feb. 8, 1949 5 Sheets-Sheet 2

INVENTORS
HONORE MARCEL BAYARD
RAYMOND JACQUES CHARLES ROQUET
BY
Adams & Bush
ATTORNEYS Sept. 19, 1950 H. M. BAYARD ET AL 2,522,739
CORRECTING DEVICE FOR TELEGRAPH SIGNALS
Filed Feb. 8, 1949 5 Sheets-Sheet 3
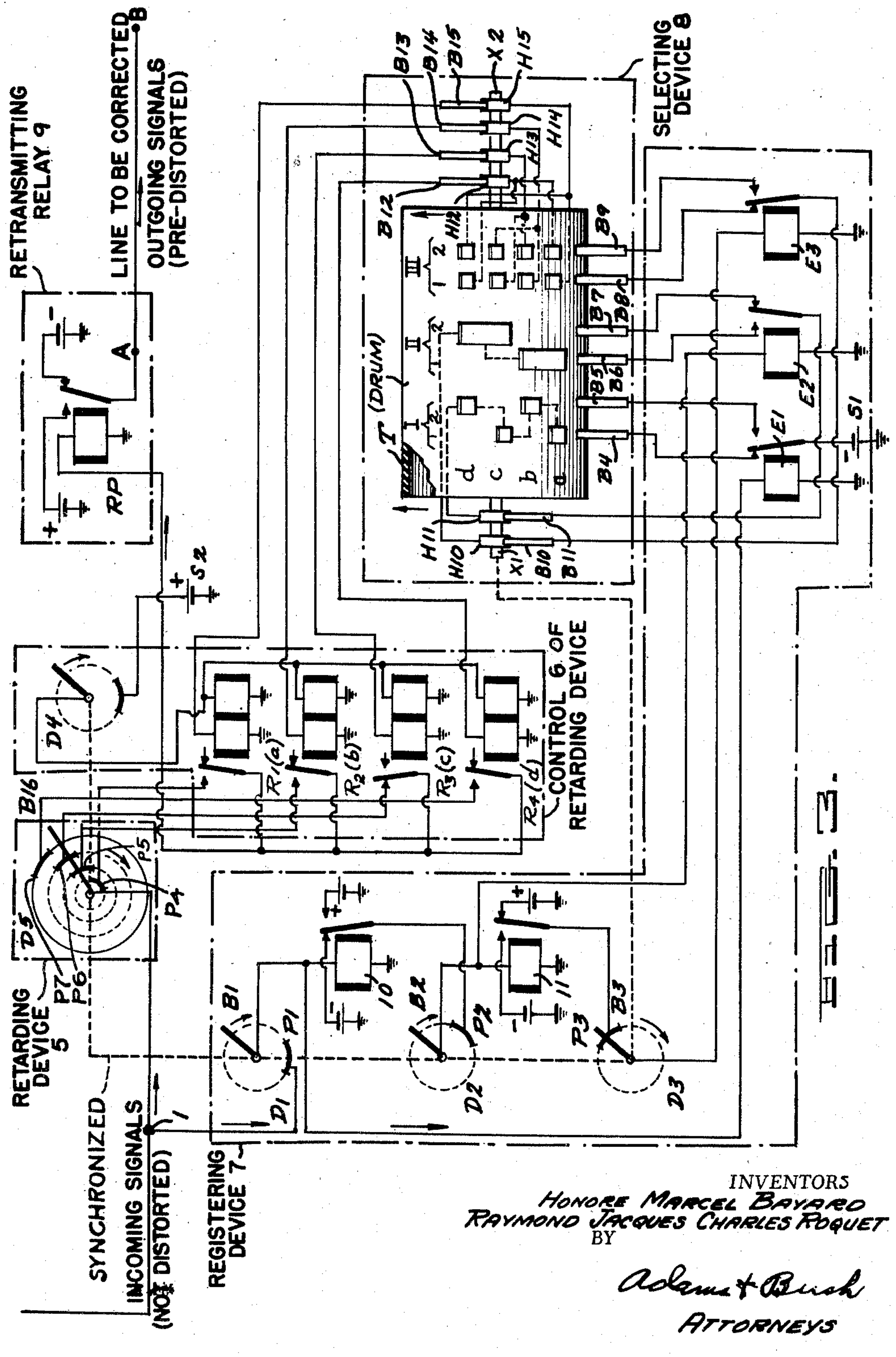
INVENTORS
HONORE MARCEL BAYARD
RAYMOND JACQUES CHARLES ROQUET
BY
Adams & Bush
ATTORNEYS

CORRECTING DEVICE FOR TELEGRAPH SIGNALS

Filed Feb. 8, 1949 5 Sheets-Sheet 4

INVENTORS
HONORE MARCEL BAYARD
RAYMOND JACQUES CHARLES ROQUET
BY
Adams & Bush
ATTORNEYS

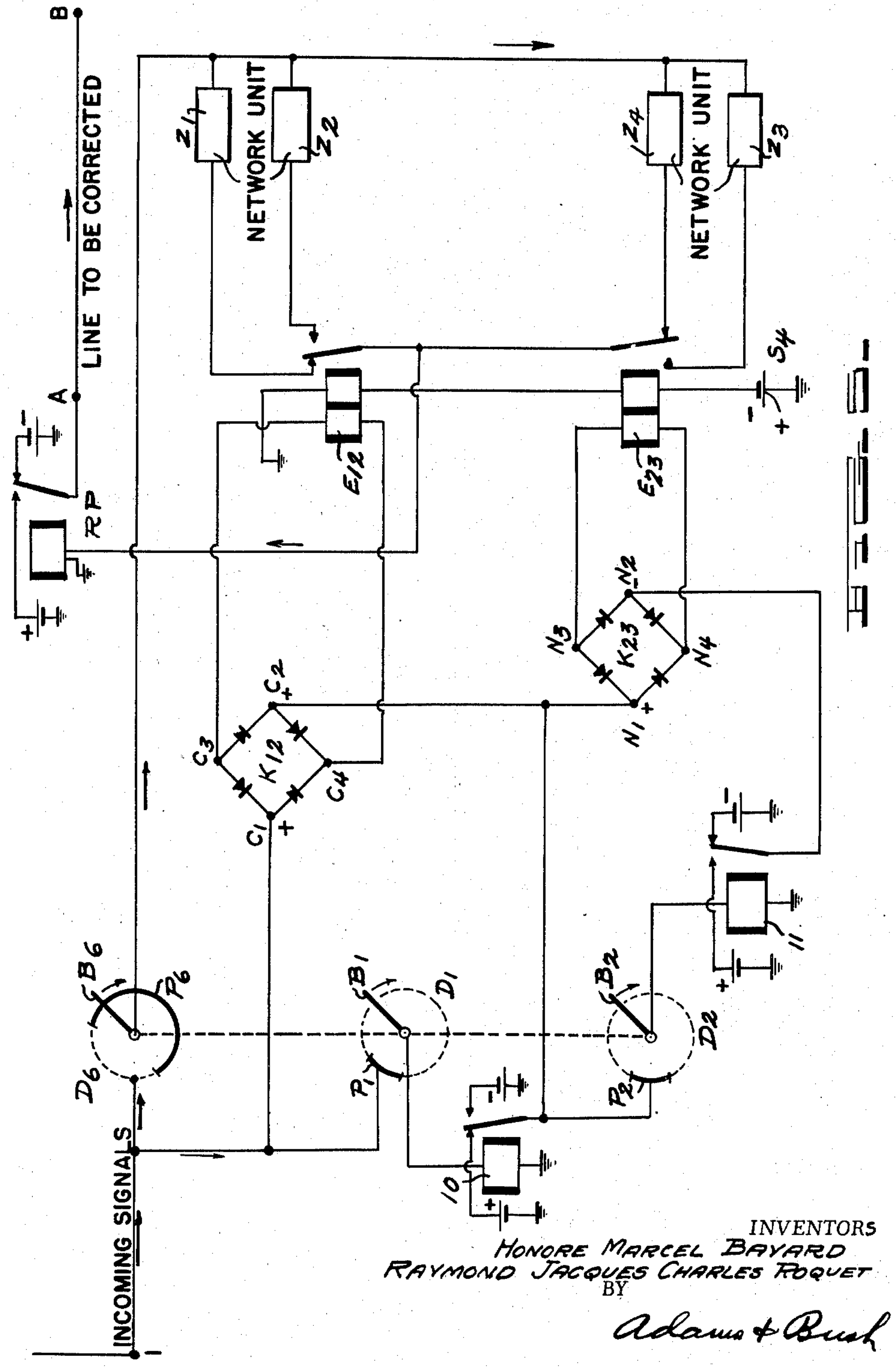
INVENTORS
HONORE MARCEL BAYARD
RAYMOND JACQUES CHARLES ROQUET
BY
Adams & Bush
ATTORNEYS Patented Sept. 19, 1950

2,522,739

UNITED STATES PATENT OFFICE 2,522,739

CORRECTING DEVICE FOR TELEGRAPH SIGNALS

Honoré Marcel Bayard, Meudon, and Raymond Jacques Charles Roquet, Clamart, France Application February 8, 1949, Serial No. 75,152
In France November 18, 1943

Section 1, Public Law 690, August 8, 1946
Patent expires November 18, 1963

13 Claims. (Cl. 178—70)

The present application is a continuation in part of our application Ser. No. 593,164, filed May 11, 1945, now abandoned.

The present invention relates to the electrical transmission of signals, as by telegraph, on transmission lines, and particularly to pre-correcting of the timing and length of coded signal element impulses, to deliver at the receiving station, a normal signal of the correct characteristics, the distortion generally caused on the transmission line having been corrected.

The present invention has for an object to provide a device permitting to compensate for the distortion imparted to electrical signals by virtue of the fact that they have been transmitted over a line.

The present invention relates only to the correction of the distortion experienced at all times due to the transmission line or channel, and which is called "characteristic distortion," and not the distortion of the kind which is called fortuitous or accidental, which is due to transient phenomena which cannot be foreseen, such for example as caused by atmospheric electricity.

The present invention is applicable in particular to systems of telegraph transmission utilizing a succession of two-value signals which can be given either one of any two different values, for example, two different intensities, or two different phases, but the description of the present invention will be made as an example taking into consideration a system in which the signals have two equal signal voltages which are of opposite signs.

The present invention is applicable to the correction of the distortion affecting the transmission of any electrical signals, and is independent of the particular code employed according to which the letters or figures transmitted are caused to correspond to these signals.

The telegraph transmission being constituted of signal elements which can have opposite polarities, the term "characteristic instants" will be applied to those instants at which a change of polarity is produced by keying action.

It is generally recognized that a certain interval of time elapses between the instant when a given electrical impulse is applied to the transmitting end of a line, for example, a change of polarity, and the instant at which this impulse manifests itself at the other distant end of this line.

All of the "characteristic instants" of a telegraph transmission, therefore, undergo a certain delay during the course of their transmission over the line.

If this delay was constant and uniform, and was of the same value for all of the various characteristic instants, only a slight inconvenience would result, since each element of the signal, separated from other elements by two characteristic instants, would be reproduced upon its arrival at the distant end of the line with the same duration that it had at the transmitting end. It would simply have had a uniform overall delay for the whole transmission.

In actual practice, such optimum operation does not occur. Experience shows that when an electrical impulse or signal is transmitted over a line, this line remains charged for an appreciable interval of time after the application of the impulse has ceased. Hence, if an isolated signal element, remote from any other signal element, is transmitted over a line, it is received at the remote end of the line with a certain interval of delay. But, if this signal element was immediately preceded by another transmitted signal element, it would be received at the remote end of the line with a different interval of delay, by reason of the fact that the current which corresponds to it, has added to it the residual current still remaining from the preceding signal element, which produces a different resultant current. This kind of variation of the delay experienced by different signal elements in a series, constitutes the "distortion" here considered.

To be more precise, besides the influence of the immediately preceding signal element, there must be also considered the influence of the still earlier signal elements which preceded the mentioned immediately preceding signal element. However, this is less important since the influence of a signal element after the termination of the application of its own initiating impulse, weakens progressively according to the length of time since the initiating impulse has been applied, because of damping action.

The amount of the delay which is applied to a given signal element during transmission over a particular line, depends on the characteristics of the line, but, for a given line, this delay depends on the signal elements which have preceded the given signal element under consideration, and it can be shown that to every different combination of these preceding signal elements there corresponds one, and only one, determined value of such delay.

However, two combinations of signal elements which differ only by the sign of all their constituent signal elements, produce the same amount of delay, as will be referred to below.

The principle of the present invention relates to the observation that the delay which a given signal element experiences during transmission over a given transmission line, depends on the particular signal elements which have previously been transmitted over that line. Hence, the present invention consists in arranging in series with the line, an adjustable retarding device, the amount of the delay applied by that device to the transmission of a given signal element being controlled in such a manner that to each combination of signal elements preceding the given signal element, there corresponds a definitely determined value of delay, in such manner that the combination of these preceding signal elements which causes in the line the smallest delay of the given signal element, causes in the retarding device the greatest delay of this given signal element, and, inversely, whence it follows that the total delay due together to both the line and to the retarding device, is rendered constant, and identical for all the given signal elements, and that distortion is thus eliminated.

To put this method of operation into practice, the device according to the present invention comprises on the one hand, an adjustable retarding device connected in series with a transmission line, and, on the other hand, a branch circuit tapped off the transmission line which comprises two groups of elements, one of which is called a register, whose function is to register the polarity of a certain number of signal elements preceding the signal element to be precorrected or delayed, and the other group of members being called a selector and being controlled by the register and having its output connected to the control circuit of the retarding device, to adjust the retarding device to the value of delay which corresponds to the particular combination of the signal elements registered.

The retarding device may be constituted of an assembly of network units of known type comprising different values of resistances and capacities, such as, for instance, the artificial line 302 described in U. S. Patent 1,843,226 to Herbig, eventually with series-connected inductances. The adjustment of the value of the delay is then obtained by introducing in series with the line, one or more of these network units. Alternatively, the retarding device may consist of a rotating distributor member in series with the line, and comprising a brush and an array of staggered contact sectors; the transmission line is then connected on the one side to the brush and on the other side to one of these contact sectors; the adjustment of the value of the delay is obtained by the selection of the particular contact sector engaged by the brush.

The register can consist of a simple embodiment of a chain of telegraph relays, that is to say, relays which, when they have received an impulse which has thrown their armature into a given position, remain in that position after the termination of that impulse, and can leave that position only if they receive an impulse of the opposite polarity. The first signal element to be registered is then received by the winding of a first relay, which takes a position which depends on the polarity of this signal element, and remains in that position, then the line is switched over onto a second relay, which receives the second signal element, and takes a position which depends on the polarity of this second signal element, and so forth. However, the register could alternatively consist of any known registering device, for example, a photographic or magnetic device.

The selector is constituted of a device which controls the value of the delay of the retarding device according to the combination of signal elements marked by the register, or otherwise expressed, this member causes a given value of delay of the retarding device to correspond to every combination of signal elements marked by the register.

This selector comprises a rotating drum carrying on its periphery, series of contact studs, the connections to these series of contact studs being effected by the means of brushes, the brush being selected under the control of relays of the register, in such manner that to every different combination of the positions of the armatures of these register relays there corresponds a different grouping arrangement of these contact studs, the different units of the retarding member being inserted into circuit in the line by retarding control relays whose energizing circuit passes through the contact sectors of the rotary distributor, in such manner that to each different grouping of these contact sectors there corresponds the energization of a definitely determined relay among the last mentioned relays, and consequently, the insertion into circuit of a given section of the retarding member.

The selector can alternatively be constituted of a certain number of arrayed rectifiers connected as a bridge, each rectifier bridge receiving at one of its corners the polarities corresponding to the one of the registered signal elements, and also receiving at the opposite corner, the polarity corresponding to the following registered signal element, this bridge supplying, furthermore, a relay which controls the insertion into circuit of a section of the retarding device, in such manner that, if the polarities of the two successive signal elements which are applied to the bridge, are the same, the corresponding relay is not energized, and the corresponding section of the retarding device is not inserted into circuit, while, if the polarities of the two successive signal elements are different, the relay is energized, and the corresponding section of the retarding device is inserted into circuit.

The correcting assembly according to the present invention is inserted ahead of the transmission line, in such manner as to correct in advance the distortion which will be applied by the latter to the transmission of the signal elements.

According to the present invention, there are then applied correct signal elements, that is to say, signal elements all of which have a duration equal to the duration of one signal element or a multiple of this duration, and the instants of the changing of polarity which separate these signal elements are delayed, as a function of the preceding signal elements, as has been explained, in such manner as to cause to correspond to each combination of these preceding signal elements, a delay interval which is calculated in such manner that each signal element arrives at the remote end of the line with the same value of delay. Hence, these signal elements are said to be "pre-corrected."

The pre-correcting device is separated from the line with which it is associated by a re-transmitter of signals, that is to say, that the pre-corrected signal elements are delivered to the winding of a relay whose armature, connected to the line, may engage a fixed contact connected to a source of positive polarity, or a fixed contact connected to a source of negative polarity, according as the pre-corrected signal element is itself a positive signal element or a negative signal element.

In the case in which the pre-correcting device according to the present invention, which is to correct the distortion caused by a line connected beyond it, does not receive the signal elements of a sending instrument placed immediately ahead of it, but does receive, by means of an incoming line situated ahead, the signal elements coming from a distant transmitter, it is necessary to arrange, between the pre-correcting device and the incoming line, a corrector of any known type, in such manner as to correct the distortion caused by the said incoming line, in order that proper signal elements shall be applied to the pre-correcting device.

The accompanying figures represent, as examples, various modes of embodying the device according to the present invention; in these devices, the delay given to each signal element is determined according to the combination of the three signal elements which precede it.

In the drawings:

Figure 3 is a detailed circuit diagram of this apparatus, wherein the register is constituted of relays associated with rotary distributors, the selector is constituted of a rotating drum, and the retarding device is constituted of a rotary distributor;

Figures 4, 4A:
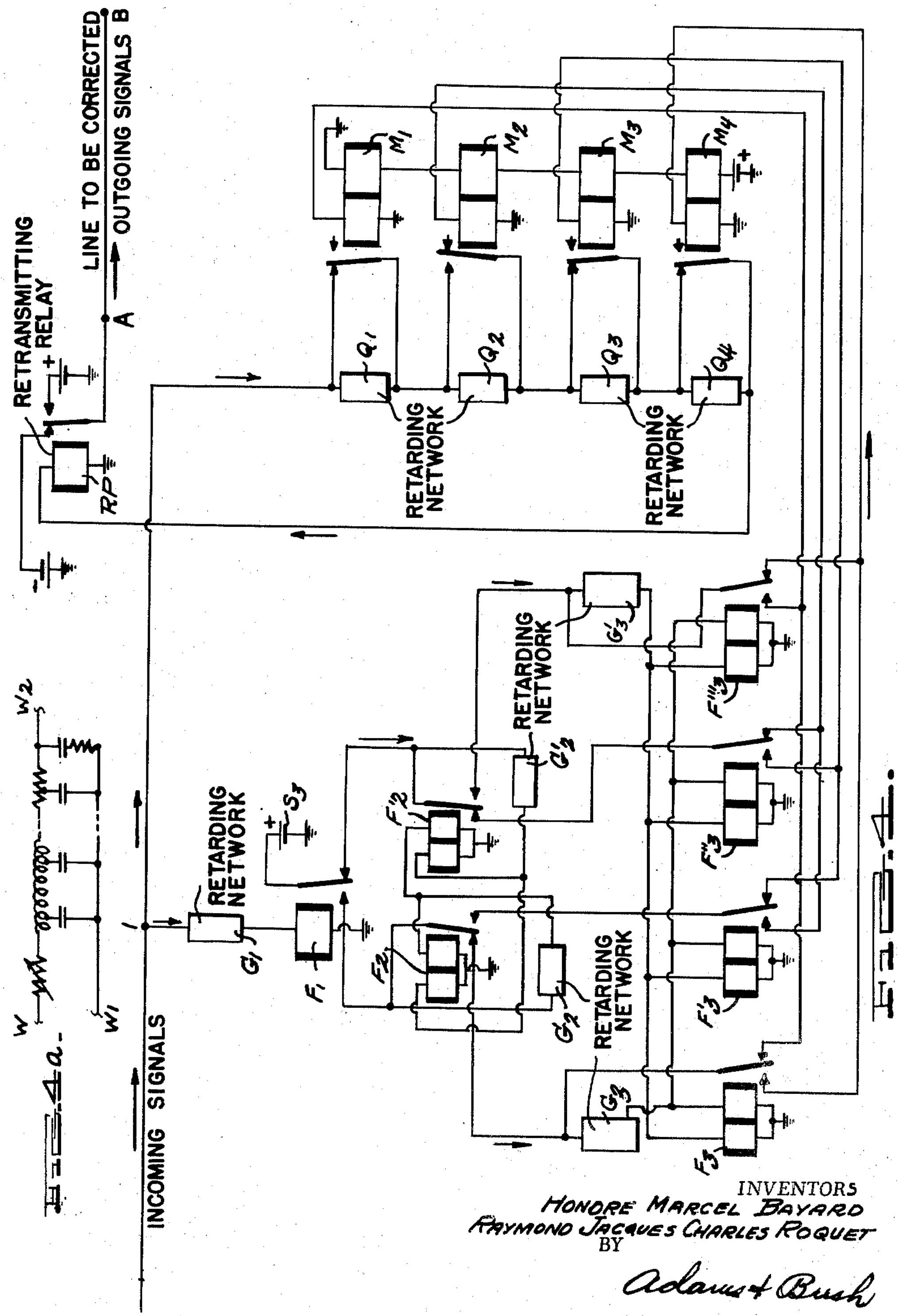
Figure 4 is a detailed circuit diagram of another arrangement of the apparatus, wherein the register and the selector are constituted of a common assembly of relays associated with retarding network units, and the retarding member is constituted of network units of known type formed of resistances, inductances, and capacities.

Figure 4-*a* shows a detail of a suitable retarding network.

Figure 5 is a circuit diagram of a modified form of the apparatus, wherein the register is constituted of relays associated with rotary distributors, the selector is constituted of rectifier bridges controlling relays, and the retarding device is constituted of an assembly of network units.

Figure 1:
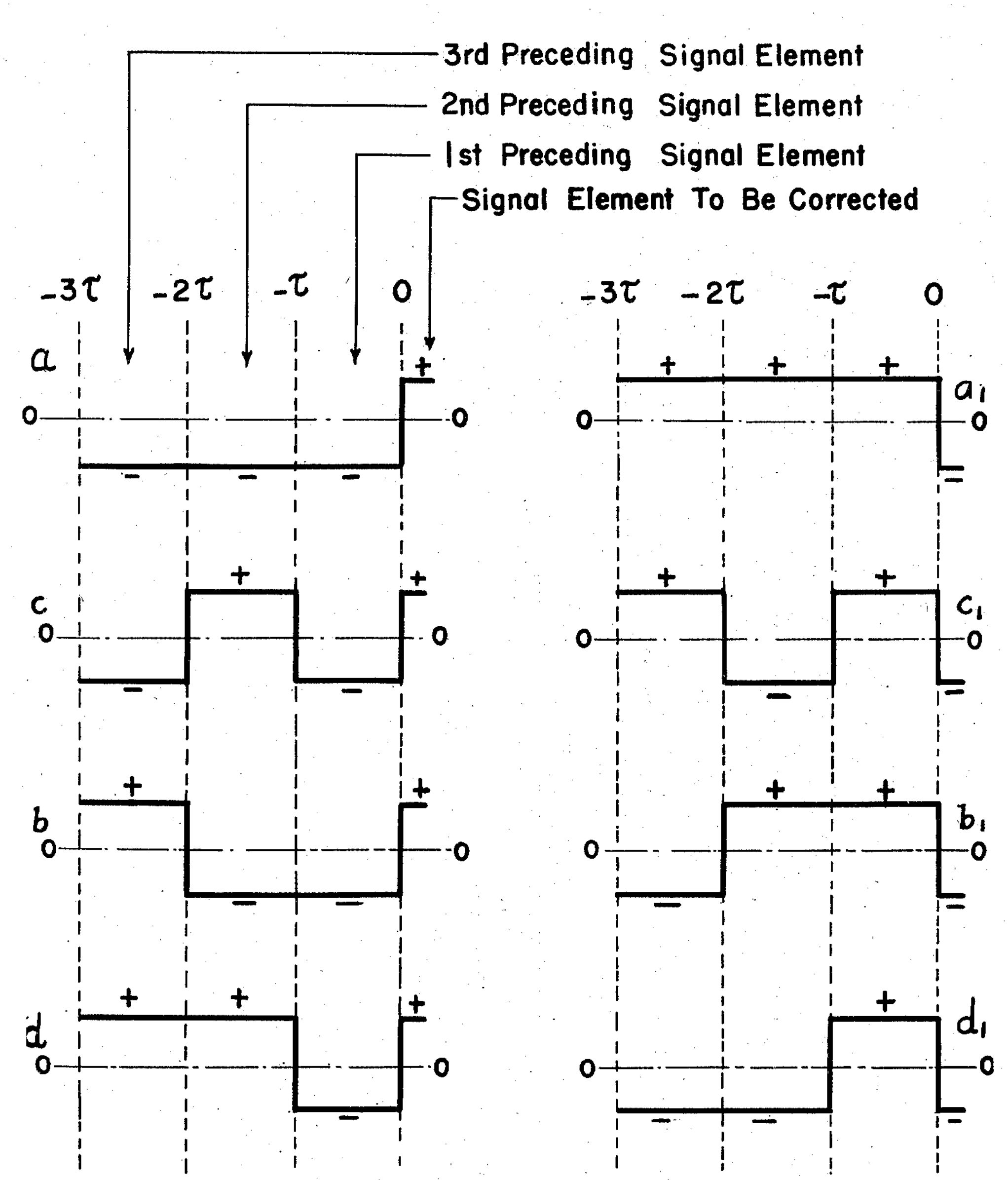
Figure 1 shows all the possible combinations of a given signal element and the three preceding signal elements.

In Figure 1, the four possible combinations of three signal elements preceding a positive signal element, are shown at *a, b, c, d*. In Figure 1, there is designated by $\tau$ the duration of a signal element, and it is assumed that the zero instant is at the beginning of a positive signal element to be corrected (that is to say, the characteristic instant which separates this signal element from the preceding signal element); the preceding signal elements then commence respectively at the instants $-\tau$, $-2\tau$, and $-3\tau$. The combinations wherein the positive signal element, which commences at zero time, is preceded by a positive signal element, are not to be taken into consideration, since, in this case, there is no change of polarity at zero time; and the pre-correcting device comes into action only to delay the instants when the polarity is changed.

At $a_1, b_1, c_1, d_1$, in Figure 1, there are shown the four combinations possible of three signal elements which precede a negative signal element. These combinations are respectively identical with the combinations *a, b, c, d*, previously mentioned, with this difference, that the positive signal elements are replaced by negative signal elements, and inversely, that is, $a_1, b_1, c_1, d_1$, are mirror images of *a, b, c, d*.

It may be easily shown that the values of delay given to the transmission of the positive signal element by the combinations of preceding signal elements *a, b, c, d* are respectively the same as the delays given to the transmission of the negative signal element by the combinations of preceding signal elements, as shown at $a_1, b_1, c_1, d_1$.

Thus, for example, when account is taken of only three signal elements which precede a given signal element, which has in the past been found to be sufficient in practice, there are only four possible different values of delay which affect this given signal element, due to the fact of the influence of these preceding three signal elements.

The retarding device, hence, should be able to give four different values of delay, each of them corresponding to the one of these combinations of preceding signal elements.

It will easily be seen that, if account is taken of the four preceding signal elements, there would be eight possible values of delay and that, in general, for $n$ preceding signal elements there would be $2^{n-1}$ possible values of delay.

Figure 2:
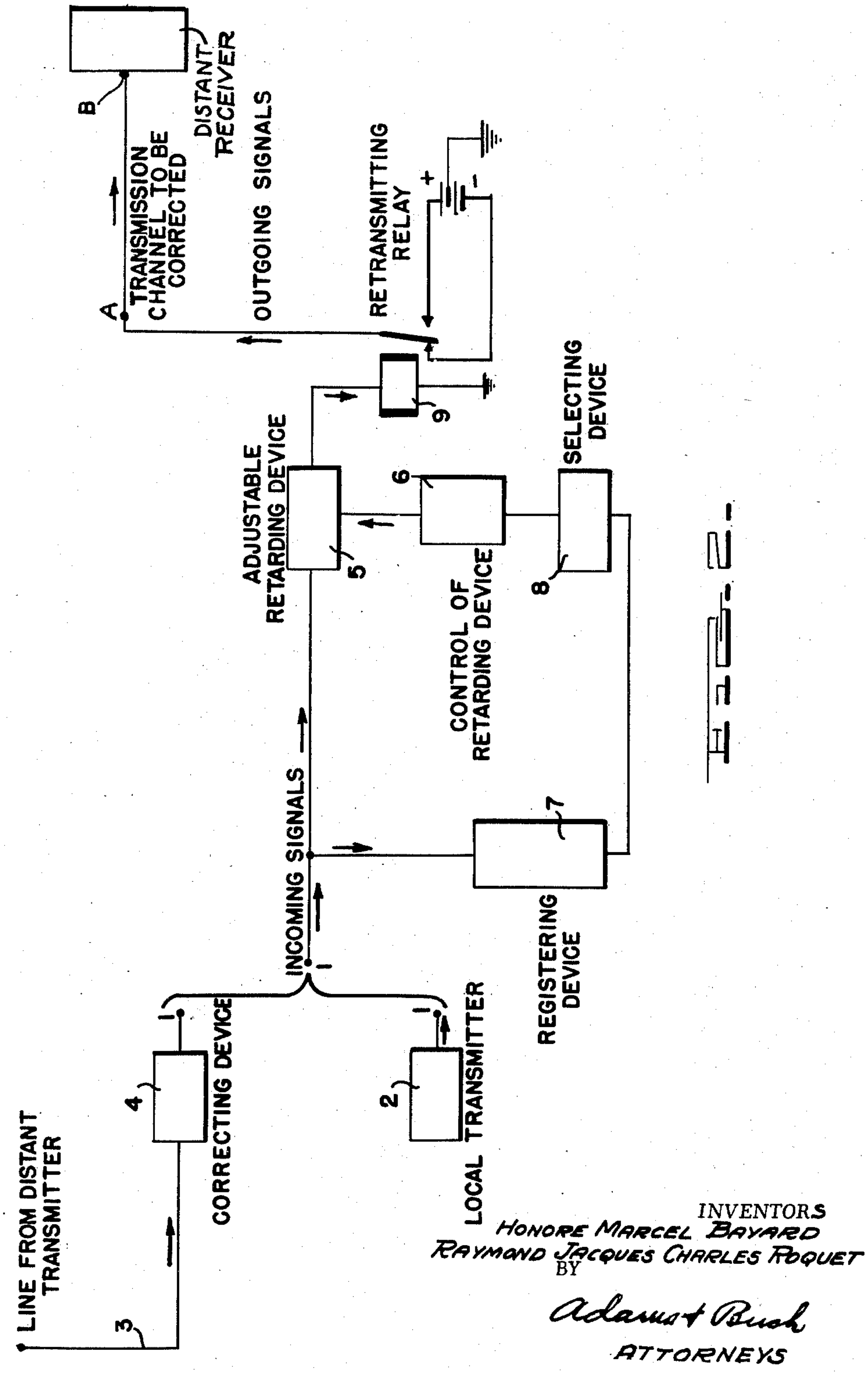
Figure 2 is a block diagram of the assembly of the apparatus according to the present invention.

Figure 2 is a block diagram of the assembly of a transmitting station provided with a pre-correcting device according to the present invention.

In Figure 2, AB is the line or the channel whose distortion is to be corrected, that is to say, on which the time of transmission of all the signal elements is to be equalized. 1 designates a terminal on which there are received or applied the signal elements which are to be transmitted onto the line AB; which signal elements may come either from a local telegraph transmitter 2 of the usual type located in the station itself, or from a remote transmitter connected to this station by an incoming line 3. In the latter case, it is necessary to interpose between this line 3 and the terminal 1, a signal corrector 4 of known type, in order that correct signals may always be applied to the terminal 1. 5 designates a retarding device which is adjustable and is inserted between the input terminal 1 and the line AB; and 6 designates the device by means of which it is possible to cause to vary the delay caused by the retarding device 5, 7 is the registering device which retains a record of the polarities of the signal elements preceding the signal element to be pre-corrected. The selector is shown at 8, which causes a given adjustment of the retarding control member 6 to correspond to every combination of signals registered by registering device 7, and, consequently, a given delay of the retarding device 5.

The re-transmitting relay 9 is inserted between the retarding device 5 and the input of outgoing line AB.

Figure 3 is a detailed circuit diagram of one embodiment of the pre-correcting device of Figure 2, according to the present invention.

The signal elements supposed to be corrected are received at terminal 1 and are transmitted to the contact sector $P_1$ of a rotary distributor $D_1$, the brush $B_1$ of this rotary distributor is connected to the winding of a registering relay 10 and also to the winding of a relay $E_1$. The armature of the relay 10, which can engage one or the other of two fixed contacts connected respectively to sources of positive and negative potentials, is connected to the contact sector $P_2$ of a rotary distributor $D_2$; the brush $B_2$ of this rotary distributor is connected to the winding of a registering relay 11 and also to the winding of a registering relay $E_2$. The armature of the relay 11, which may engage one or the other of two fixed contacts connected, respectively, to sources of positive and negative potential, is connected to the sector $P_3$ of the rotary distributor $D_3$, and the brush $B_3$ of rotary distributor $D_3$ is connected to the winding of a registering relay $E_3$.

The brushes of the three rotary distributors $D_1$, $D_2$, $D_3$ rotate at the same speed, under the action of a common drive, making one turn during the interval of one signal element of the code employed. By duration of a signal element is meant the duration of a correct signal such as is produced by the transmitter, and not being affected by a distortion modifying this duration. The contact sectors of the distributors $D_1$, $D_2$, $D_3$ are angularly staggered with reference to each other. The contact sectors $P_1$, $P_2$, $P_3$ of the rotary distributors are staggered in such manner that brush $B_3$ will have left contact sector $P_3$ when brush $B_2$ gets to contact sector $P_2$, and that brush $B_2$ will have left contact sector $P_2$ when brush $B_1$ gets to contact sector $P_1$.

The manner of operation of this register part of the embodiment of Figure 3 is as follows:

Let it be assumed that the three signal elements preceding the signal element to be corrected, have respectively the polarities minus, plus, minus, which corresponds to the combination *c* of Figure 1.

At the instant of time $-3\tau$, the third preceding signal element, preceding the signal element to be corrected, which is the one first received, is received at terminal 1 and applied to the contact sector $P_1$ of the rotary distributor $D_1$. When, between the instants $-3\tau$ and $-2\tau$, the brush $B_1$ passes over contact stud $P_1$, the negative polarity of the signal element is applied to the windings of registering relays 10 and $E_1$, whose armatures swing to the left.

Upon the following turn of the rotary distributors, between the instants $-2\tau$ and $-\tau$, the brush $B_2$ of rotary distributor $D_2$ comes into position to touch contact sector $P_2$ before brush $B_1$ touches contact sector $P_1$. The armature of relay 10 is then still on its negative fixed contact, and a negative polarity is sent to the winding of registering relay 11 and to registering relay $E_2$, which swing over to their left fixed contacts.

Then, when brush $B_1$ comes into position to touch contact sector $P_1$, the positive polarity of the second preceding signal element is applied to the winding of registering relay 10 and to registering relay $E_1$, which swing over onto their right fixed contacts.

On the following turn of the rotary distributors, between the instants $-\tau$ and zero, the brush $B_3$ comes first into position to touch contact sector $P_3$, and sends the negative polarity of the armature of registering relay 11 to the winding of relay $E_3$, which swings over onto its left fixed contact. Then, brush $B_2$ comes into position to touch contact sector $P_2$ and sends the positive polarity of the armature of relay 10 to the winding of relay 11 and to relay $E_2$ which swing onto their right fixed contacts. Then, brush $B_1$ comes into position to touch contact sector $P_1$, and the negative polarity of the first signal element preceding the signal element under consideration, is applied to the windings of relay 10 and relay $E_1$, which swing over to their left fixed contacts.

Thus, at zero time, at the instant when the signal element to be pre-corrected is received at input terminal 1, the positioning of the armatures of relays $E_1$, $E_2$, $E_3$ is as follows, due to the three preceding signal elements combination *c* of Figure 1. The registering relay $E_1$ is on its left fixed contact, corresponding to the negative polarity of the first preceding signal element; the registering relay $E_2$ is on its right fixed contact, corresponding to the positive polarity of the second preceding signal element, the registering relay $E_3$ is on its left fixed contact corresponding to the negative polarity of the third preceding signal element.

To every different one of the several combinations of the three preceding signal elements of Fig. 1, there thus corresponds a different combination of the positions of the armatures of the three registering relays $E_1$, $E_2$, $E_3$.

The selector part of Figure 3 comprises a rotating drum T whose peripheral surface is shown developed, and which rotates in the direction of the arrow, about a shaft $X_1X_2$, in synchronism with the rotary distributors $D_1$, $D_2$, $D_3$ of the register. The insulated peripheral surface of this drum T carries, on parallel circumferential circles, as many sets of two series of contact studs as there are preceding signal elements which are to be taken into account for the determination of the delay to be given to the transmission of a given signal element to be corrected. Considering that in the example here under consideration, account has been taken of three preceding signal elements, the drum carries three sets I, II, III, of contact studs, each comprising two rows 1 and 2 of contact studs. These three sets can be placed respectively into contact through the means of the brushes $B_4$ to $B_9$, with the fixed contacts of the three relays $E_1$, $E_2$, $E_3$ of the register.

Each set is constituted by as many contact studs arranged on parallel longitudinal generating elements of the cylindrical drum T as there are possible combinations of the signal elements registered. For three registered signal elements, there are, as has been seen already, four different combinations *a, b, c, d* (except for the sign), and consequently, the contact studs of each range are alined respectively along four longitudinal elements *a, b, c, d,* of the cylindrical drum, the arrangement of the contact studs along each one of the cylindrical elements being different in each case, and arranged in a manner such that it is possible, as will be seen hereinafter, to cause to correspond respectively the combinations of the contact studs *a, b, c, d,* along these four cylindrical elements with the several combinations of signal elements *a, b, c, d* of Figure 1.

The contact studs of the set I of drum T (Fig. 3) are connected through the means of a slip ring $H_{11}$ and of a brush $B_{11}$ to the armature of the relay $E_2$, and the contact studs of the set II are connected to the armature of the relay $E_3$ through a slip ring $H_{10}$ and a brush $B_{10}$. The contact studs of the series 1 and series 2 of the set III being interconnected in pairs, are connected by four slip rings $H_{12}$ to $H_{15}$, and four brushes $B_{12}$ to $B_{15}$, to the windings of four relays $R_4$, $R_3$, $R_2$, $R_1$, serving for the control of the retarding device. These retarding control relays are energized, through the means of the various contact studs of the selector drum T, from a source $S_1$.

In the embodiment of Figure 3, the retarding member is constituted of a rotary distributor $D_5$ rotating in synchronism with the rotary distributors $D_1$, $D_2$, $D_3$ of the register and in synchronism with the selector drum T.

This retarding rotary distributor $D_5$ comprises a brush $B_{16}$ which is connected to the line on which the incoming signals are received, or the local sending instrument, and four contact sectors $P_4$ to $P_7$ mutually staggered and connected respectively to the left fixed contacts of the retarding control relays $R_4$, $R_3$, $R_2$, $R_1$; the armatures of these relays are connected in parallel to the winding of a re-transmitting relay RP whose armature sends signals over the line AB whose distortion is to be corrected.

It will be realized that, according to the particular contact sector $P_4$ to $P_7$ to which outgoing line AB is at a given instant connected by the one of the relays $R_1$ to $R_4$, the instant at which this line AB will be placed in communication with the input terminal 1 will be retarded to a greater or less extent. The angular orientations of contact sectors $P_4$, $P_5$, $P_6$, $P_7$ are arranged in such manner as to respectively cause a delay equal to the delay which should be applied to the signal element to be transmitted, according as this signal element is preceded by the particular combinations of signal elements designated *a*, *b*, *c*, or *d* (Fig. 1).

The operation of this selector assembly of Figure 3 is as follows:

Let it be assumed, as has been previously explained, that the armatures of the relays $E_1$, $E_2$, $E_3$ of the register of Figure 3, have been placed respectively on their left fixed contacts, their right fixed contacts, and their left fixed contacts, which corresponds to the combination of signal elements *c* of Figure 1, then it is the contact sector $P_6$ of the retarding device of distributor $D_5$, which ought to be brought into operation by the retarding control relay $R_3$. It is easy to verify that this condition really obtains; for this it is necessary that the battery $S_1$ should be connected to the winding of retarding relay $R_3$ by the brush $B_{13}$, through the different sets of contact studs of the selector and the contacts of the register relays $E_1$, $E_2$, $E_3$.

Now the battery $S_1$ is connected to the armature of the register relay $E_1$, which now occupies the position on its left fixed contact, and is then connected to the brush $B_4$. When the brushes $B_4$ to $B_9$ pass over the longitudinal element *a* of the cylindrical drum T, the brush $B_4$ engages a conducting contact stud which is connected through slip ring $H_{11}$ and brush $B_{11}$ to the armature of register relay $E_2$ and thence to the brush $B_7$, but this latter brush in this position *a* occupies a position on an insulated part of the cylindrical drum T, and the circuit is opened. Likewise, when the brushes $B_4$ to $B_9$ pass over the longitudinal element *b* of the cylindrical drum, the circuit is opened at the same time at brush $B_4$ and at brush $B_7$.

On the other hand, on the longitudinal element *c* of the cylindrical drum, the circuit is closed through: grounded frame, battery $S_1$, armature of register relay $E_1$, left contact of relay $E_1$, brush $B_4$, contact stud *c* of set $I_1$, brush $B_{11}$, armature of register relay $E_2$, right contact of relay $E_2$, brush $B_7$, contact stud *c* of the set $II_2$, brush $B_{10}$, armature of register relay $E_3$, left contact of relay $E_3$, brush $B_8$, contact stud *c* of set $III_1$, brush $B_{13}$, winding of relay $R_3$, grounded frame. The retarding relay $R_3$ is energized, and the line is connected, through the means of retransmitter RP, to the contact sector $P_6$ of the retarding device.

The retarding control relays $R_1$ to $R_4$ comprise a second winding shown on their right, acting in magnetic opposition to the first winding, and which second windings connected in parallel are energized from a battery $S_2$ through the means of a restoring rotary distributor $D_4$ synchronized with the other rotary distributors $D_1$, $D_2$, $D_3$, $D_5$, disconnect from the line AB all of the contact sectors $P_4$ to $P_7$, in such manner that the retarding device is ready to operate anew for the pre-correction of the following signal element to be transmitted.

Figure 4 shows another kind of modified embodiment of the device according to the present invention, utilizing only relays and retarding network units, to the exclusion of using any rotating distributors or other members, as in Fig. 3.

In this arrangement of Figure 4, the retarding device inserted in series in the line is constituted of four retarding network units of known type, $Q_1$ to $Q_4$, such as, for instance, the artificial line 382 described in the U. S. Patent 1,843,226 to Herbig, eventually with series-connected inductances, normally short circuited through contacts of relays $M_1$ to M under the action of the current passing continuously through the right windings of the retarding insertion relays $M_1$ to $M_4$, which play the same role as the relays $R_1$ to $R_4$ of Figure 3.

These network units $Q_1$ to $Q_4$ introduce in the transmission of the signal elements, delays correcting respectively the delays due to the combinations of the preceding signal element *a*, *b*, *c*, *d*, of Figure 1. To put one of the units $Q_1$ to $Q_4$ into circuit, it is necessary to energize the left winding of the corresponding relay $M_1$ to $M_4$.

The registering-selecting assembly is constituted of three stages of relays: $F_1$ for the first stage, $F_2$ and $F'_2$ for the second stage, $F_3$, $F'_3$, $F''_3$, $F'''_3$ for the third stage.

The registering relay $F_1$ receives the incident signal element through the means of a network unit $G_1$ causing a delay less than the duration of one signal element; the relays $F_2$ and $F'_2$ are energized by the battery $S_3$ through one of the contacts of relay $F_1$, and network units $G_2$ and $G'_2$ cause a delay of the duration of one signal element; the relays $F_3$, $F'_3$, $F''_3$, $F'''_3$ are energized by the battery $S_3$ through the means of the contacts of relay $F_1$, and of relay $F_2$ or $F'_2$, and of the retarding network units $G_3$ and $G'_3$ which are identical with $G_2$ and $G'_2$.

Each of these retarding networks may comprise at least one series-connected resistance and one shunt-connected condenser such as, for instance, the elements of the artificial line 382 of the U. S. Patent 1,843,226 and as shown in Fig. 4*a*.

In this arrangement of Figure 4, the relays $M_1$ to $M_4$ are energized by the battery $S_3$ through the means of the contacts of at least one relay of each of the three stages.

By reason of the successive delays due to the retarding network units of the three successive stages, the armature of the relay $F_1$ assumes one or the other of its two positions, according to the polarity of the first signal element preceding the signal element to be pre-corrected. The armatures of the two relays $F_2$ and $F'_2$ assume one or the other of their two positions, according to the polarity of the second signal element preceding the signal element to be pre-corrected, and the armatures of the four relays $F_3$, $F'_3$, $F''_3$, $F'''_3$, assume the one or the other of their two positions, according to the polarity of the third signal element preceding the signal element to be pre-corrected.

To every different combination of these three preceding signal elements there corresponds then a different situation of the assembly of the relays.

The detailed operation of the form of the device of Figure 4 is as follows:

Assume, as in the preceding example of Figure 3, that the first signal element preceding the signal element to be corrected, is a negative signal element. The signal element preceding this latter (the second preceding signal element) is a positive signal element, and the signal element preceding this latter (the third preceding signal element), is a negative signal element (combination *c* of Figure 1).

Assume further that the relays swing onto their right fixed contact when their right winding receives a negative polarity, and onto their left fixed contact when their left winding receives a negative polarity, and inversely.

It will be further assumed that the network unit $G_1$ in series with the relay $F_1$ of the first stage causes a delay equal to three-quarters of the duration of a signal element, so that at the time $-3\tau$, the third (negative) preceding signal element, which is the one first received, is received on the input terminal 1, and, at the time $$-\left(2\tau+\frac{\tau}{4}\right)$$

by reason of the delay due to retarding unit $G_1$, it is applied to the winding of relay $F_1$ whose armature swings onto its right fixed contact. The positive polarity of the source $S_3$ is then applied simultaneously to the left windings of the two relays $F_2$ and $F'_2$, which at the instant $$-\left(\tau+\frac{\tau}{4}\right)$$

by reason of the delay due to retarding network $G'_2$, both swing toward the right.

The positive polarity of the battery $S_3$ (Fig. 4) is then delivered, through the means of the armature of the register relay $F'_2$, to the left windings of the four register relays $F_3$, $F'_3$, $F''_3$, $F'''_3$, which, at the time $$-\frac{\tau}{4}$$

swing to the right.

But at the time $$-\left(2\tau+\frac{\tau}{4}\right)$$

at the same time as the registering relays $F_2$ and $F'_2$ operate, another signal element, this time of positive polarity, has arrived at the terminal 1, and, at the time $$-\left(\tau+\frac{\tau}{4}\right)$$

it has been applied to the relay $F_1$, which has swung to the left; the positive polarity of the battery $S_3$ is then applied, through the means of the retarding network $G_2$, to the right windings of the two registering relays $F_2$ and $F'_2$, which, at the time $$-\frac{\tau}{4}$$

by reason of the delay due to retarding network $G_2$, swing to the right.

Finally, at the time $$-\left(\tau+\frac{\tau}{4}\right)$$

at the same time as the registering relays $F_2$ and $F'_2$ operate, another signal element, of negative polarity, has arrived at the input terminal 1, and, at zero time, it has been applied to the registering relay $F_1$, which has swung to the right.

The situation of the three relays of the three stages is then the following at zero time, when the signal element to be pre-corrected arrives, the armature of relay $F_1$ is on the right contact, the two registering relays $F_2$ and $F'_2$ are on the left, and the registering relays $F_3$, $F'_3$, $F''_3$, $F'''_3$ are on the right. It may be easily seen, following the circuit diagram, that only the retarding control relay $M_2$ is then energized, and slightly later the retarding network $Q_2$ is introduced in series in the line.

Figure 5 represents another modified embodiment, in which there are registered, not the polarity of each of the three signal elements preceding the signal element to be corrected, but only the respective relative senses of these signals. For example, the combination of signal elements $b_1$ of Figure 1 is analyzed thus: the polarity of the third (negative) preceding signal element is different from that of the second preceding (positive) signal element and the polarity of the first (positive) preceding signal element is the same as that of the second (positive) preceding signal element. The polarity of the first preceding signal element is always, by the previous assumptions, as has been previously explained, different from the polarity of the signal element to be pre-corrected.

It is seen that, in this device, it is sufficient, in order to characterize the combination of "$n$" preceding signal elements, to register $(n-1)$ agreements or disagreements of polarity.

The device shown in Figure 5 employs a register with rotary distributors analogous to that of Figure 3, and a retarding assembly consisting of network units.

The selector comprises a first rectifier assembly $K_{12}$ of four rectifiers arranged in bridge form, two of the opposite corners of this bridge being connected, one of them $C_1$ to the input terminal 1 of the incoming signal element, and the other opposite corner $C_2$ being connected to the armature of relay 10, and the two other corners $C_3$ and $C_4$ being connected to energize a relay $E_{12}$. A second rectifier bridge unit $K_{23}$ has one of its corners $N_1$ connected to the armature of the relay 10, and the opposite corner $N_2$ connected to the armature of the relay 11, while the other two corners $N_3$ and $N_4$ are connected to energize the winding of a relay $E_{23}$. The relay $E_{12}$ introduces in series in the line, the one or the other of two network units $Z_1$ and $Z_2$, and the relay $E_{23}$ introduces in series in the line, the one or the other of the two network units $Z_3$ and $Z_4$. The network units $Z_1$, $Z_2$, $Z_3$, $Z_4$ have different electrical values, and may be of the type shown in Fig. 4*a*.

The two relays $E_{12}$ and $E_{23}$ each have a supplementary winding, continuously energized, which tends to restore their armatures to a defined position.

A rotary distributor $D_6$, synchronized with rotary distributors $D_1$ and $D_2$, is in series in the line, and permits the incoming signal elements to reach the re-transmitting relay RP only when the brushes of the rotary distributors $D_1$ and $D_2$ are not in contact with their sectors $P_1$ and $P_2$.

The operation of this device of Figure 5, is as follows:

As has already been explained regarding Figure 3, immediately before the reception of the signal element to be pre-corrected (assumed to be negative), the input terminal 1 is at the polarity of the first preceding signal element (which is positive in the example under consideration), the armature of the relay 10 is in the position corresponding to the positive polarity of the second preceding signal element, and the armature of the relay 11 is at the (negative) polarity of the third preceding signal element.

The two opposite corners $C_1$ and $C_2$ of the rectifier bridge $K_{12}$ are then at the same (positive) polarity, and no current is sent from the terminals $C_3$, $C_4$ to the left winding of the relay $E_{12}$, whose armature stays on its upper fixed contact, under the influence of the restoring or holding current sent by the battery $S_4$ in its right winding; the network $Z_1$ is inserted in series in the line.

On the contrary, the two opposite corners $N_1$ and $N_2$ of the rectifier bridge $K_{23}$ are of opposite polarities (positive and negative) and the left winding of the relay $E_{23}$ is energized; its armature swings onto its right fixed contact, the action of the left winding predominating over that of the right winding; the retarding network unit $Z_4$ is inserted in series in the line.

Thus, when the signal element to be pre-corrected is received at input terminal 1, and since the brush $B_6$ of rotary distributor $D_6$ passes to its contact sector $P_6$, the assembly of the retarding networks $Z_1$ and $Z_4$ in parallel is placed in series in the line.

It may be easily seen in Figure 5 that to the combination of the three preceding signal elements shown at *a* or $a_1$ (Fig. 1), there corresponds the insertion in series in the line of networks $Z_1$ and $Z_3$, and that there corresponds to the combination shown at *c* or $c_1$ (Fig. 1), the insertion in series in the line of networks $Z_2$ and $Z_4$, and that there corresponds to the combination shown at *d* or $d_1$ (Fig. 1), the insertion in series in the line of network units $Z_2$ and $Z_3$.

To every different combination of the preceding signal elements, there corresponds, therefore, a particular grouping of the retarding network units, and it is sufficient to select the characteristics of these network units to be different and so that each one of these groupings will give rise to a delay which compensates for the delay which is due to the corresponding combination of signal elements.

It will be apparent to those skilled in the art that our invention is susceptible of modifications to adapt the same to particular applications, and all such modifications which are within the scope of the appended claims, we consider to be comprehended within the spirit of our invention.

The apparatus which has been described makes possible the pre-correction of distortion while taking into consideration, for example, three signal elements preceding the signal element to be pre-corrected. It is apparent that the present invention is not limited to apparatus to take into consideration three preceding signal elements, but permits further the taking into consideration of any number of these preceding signal elements.

Having thus described the invention, what is claimed is:

1. In apparatus for pre-correcting two-value telegraph code signals to compensate for the distortion which they will undergo during transmission over a line, a signal source of successive coded telegraph signals to be transmitted, an outgoing transmission line on which said coded signals are to be transmitted, a transmitting relay having an actuating winding and an armature and two fixed contacts and adapted to transmit two-value signal elements and having its armature connected to said line, selective signal retarding means adapted to impart to an impressed signal selectively any desired one of a plurality of values of delay and being connected in series between said signal source and the winding of said transmitting relay, registering means connected to said signal source for deriving a portion of signal energy therefrom, said registering means comprising a chain of registering relays each of which has an armature and two fixed contacts and being adapted to electrically record by the positions of their said armatures with reference to their said contacts, the polarity of each of three signal elements preceding a given signal element, and selecting means having its input connected to said chain of relays for actuation by the polarities of the respective preceding signal elements so recorded by said registering means, and having its output connected to said selective signal retarding means for selecting a desired one of said plurality of values of delay according to the particular polarities of said preceding signals, whereby each signal applied to said transmission line is retarded by a delay period which is a function of the values of the three signals preceding it.

2. In apparatus for pre-correcting two-value telegraph code signals to compensate for the distortion which they will undergo during transmission over a line, a signal source of successive coded telegraph signals to be transmitted, an outgoing transmission line on which said coded signals are to be transmitted, a transmitting relay having an actuating winding and an armature and two fixed contacts and adapted to transmit two-value signal elements and having its armature connected to said line, selective signal retarding means adapted to impart to an impressed signal selectively any desired one of a plurality of values of delay and being connected in series between said signal source and the winding of said transmitting relay, said selective signal retarding means comprising a retarding rotary distributor having a plurality of staggered contact sectors, and further comprising an array of retarding control relays connected for selectively connecting one of said sectors of said retarding rotary distributor to the winding of said transmitting relay, registering means connected to said signal source for deriving a portion of signal energy therefrom, said registering means comprising a chain of registering relays each of which has an armature and two fixed contacts and being adapted to electrically record by the positions of their said armatures with reference to their said contacts, the polarity of each of three signal elements preceding a given signal element, said registering means further comprising register timing switch means, and selecting means comprising a rotatable drum having circumferential rows of contact studs, and further having brushes adapted to engage said studs, said brushes being connected for energization by the polarities of the respective preceding signal elements so recorded by said registering means, and connections from said contact studs to the actuating windings of said retarding control relays respectively, said contact studs of said drum being arranged thereon in register with its said brushes and being arranged to selectively apply control voltage from said registering means to said retarding control relays in accordance with the polarities of the signals from said source, and synchronizing means for synchronizing said register timing means and said retarding rotary distributor and said drum.

3. In apparatus for pre-correcting two-value telegraph code signals to compensate for the distortion which they will undergo during transmission over a line, a signal source of successive coded telegraph signals to be transmitted, an outgoing transmission line on which said coded signals are to be transmitted, a transmitting relay having a winding and an armature and two fixed contacts and adapted to transmit two-value signal elements and having its armature connected to said line, selective signal retarding means adapted to impart to an impressed signal selectively any desired one of a plurality of values of delay and being connected in series between said signal source and the winding of said transmitting relay, said selective signal retarding means comprising a plurality of retarding network units connected in series and said units respectively having different delay characteristics, an individual retarding control relay for each said unit having a controlled contact connected to short-circuit said unit, registering means connected to said signal source for deriving a portion of signal energy therefrom, said registering means comprising a chain of registering relays each of which has an armature and two fixed contacts, and being adapted to electrically record by the positions of their said armatures with reference to their said contacts, the polarity of each of three signal elements preceding a given signal element, auxiliary retarding network units connected in series with the actuating windings of said registering relays constituting said chain, and connections from output contacts of said chain of registering relays respectively to actuating windings of said retarding control relays for selectively actuating said retarding control relays in accordance with the polarities of said respective preceding signal elements so recorded by said registering means.

4. In apparatus for pre-correcting two-value telegraph code signals to compensate for the distortion which they will undergo during transmission over a line, a signal source of successive coded telegraph signals to be transmitted, an outgoing transmission line on which said coded signals are to be transmitted, a transmitting relay having an actuating winding and an armature and two fixed contacts and adapted to transmit two-value signal elements and having its armature connected to said line, selective signal retarding means adapted to impart to an impressed signal selectively any desired one of a plurality of values of delay and being connected in series between said signal source and the winding of said transmitting relay, said selective signal retarding means comprising two pairs of network units having different electrical characteristics, and a pair of retarding control relay means adapted to selectively connect one terminal of one unit of each said pair in parallel to the winding of said transmission relay and to connect the other terminal of said unit of each said pair in parallel to said signal source, registering means connected to said signal source for deriving a portion of signal energy therefrom, said registering means comprising a pair of chain connected registering relays each of which has an armature and two fixed contacts and being adapted to electrically record by the positions of their said armatures with reference to their said contacts the polarity of signal elements, said registering means further comprising a pair of registering rotary distributors connected respectively in series with the actuating winding of each said registering relay, a pair of rectifier bridges each having two opposite corners connected respectively between one terminal of each said distributor and the armature of each said registering relay, the other two corners of each said rectifier bridge being connected respectively to the actuating windings of each of said retarding control relay means, and an auxiliary rotary distributor connected in series between said signal source and said selective signal retarding means, and synchronizing means for synchronizing said registering rotary distributors and said auxiliary rotary distributor, said two registering rotary distributors having differently angularly oriented single contact sectors, and said auxiliary rotary distributor having a single contact sector so oriented differently from said contact sectors of said two registering rotary distributors that the incoming signal elements are applied to said transmitting relay only when the derived portion of the incoming signals is not being transmitted through said registering means to the windings of said retardation control relays.

5. In a system of transmission of signals, a device for transmitting signals of two opposite polarities, having no distortion, a retransmitting relay whose contacts are connected respectively to two sources of different polarities and whose armature is connected to a transmission line, an adjustable retarding device arranged between said transmitting device and said retransmitting relay, a branch circuit connected between the transmitting device and the retarding device, said branch circuit comprising a registering member to register the polarities of a certain number of signals preceding the signal to be delayed, and a selector member connected to the output terminals of the registering member and also connected to the adjusting control circuit of said retarding device, to adjust said retarding device in such manner that to each different combination of the preceding signals registered by the registering member, there corresponds a given value of delay, so that the combination of the preceding signals which encounters in said line the smallest value of signal delay causes in the retarding device the greatest value of delay of this signal, and inversely, in order that the total delay due to the line and to the retarding device shall be made constant and that all the signals thus reach the remote end of the line with the same value of delay.

6. A system of signal transmission according to claim 5, said registering member comprising a certain number of rotary distributors, each of said rotary distributors comprising a fixed conducting member and a brush rotating continuously and making one rotation during the duration of one undistorted signal, the fixed contact members of successive distributors being staggered with reference to each other, the contact member of the first distributor being connected to the transmitter of undistorted signals, the brush of each distributor being connected to the winding of a relay of a first group of intermediate relays whose contacts are maintained at potentials which are equal and opposite in polarity, and also being connected to the winding of a relay of a second marking group of relays, the armature of each of said intermediate relays being connected to the contact of the next distributor.

7. A transmission system according to claim 6, the intermediate relay and the marking relay of said registering member, which relays are connected to the brush of the same rotary distributor, having a common actuating winding and a common magnetic circuit.

8. A transmission system according to claim 5, said selector member comprising a cylinder rotating at the rate of one rotation during the duration of one undistorted signal and carrying on its insulated periphery a plurality of ranges of conducting elements arranged on parallel circles, a first set of fixed brushes connected to the contacts of the marking relays of the registering member and arranged in operative relation with said ranges of conducting elements, a second set of brushes adapted to be put in connection with the first ranges of contact elements and the armatures of the marking relays of the registering member, and a third set of brushes putting in connection each contact element of the last range and the winding of a relay of a group of marking relays of the selector member, whereby to each combination of the positions of the marking relays of the registering member there corresponds the energization of a determined marking relay of the selector member.

9. A transmission system according to claim 5, said retarding device comprising a rotary distributor rotating at the rate of one rotation during the duration of an undistorted signal, said rotary distributor having a brush connected to the transmitter which transmits the signals to be pre-distorted, and further comprising a plurality of conducting elements staggered with reference to each other and being respectively connected to the operated position contacts of the marking relays of the selector, the armatures of said last mentioned marking relays being connected in parallel and being connected through a re-transmitting relay to the input terminals of the line to which the pre-corrected signals are applied.

10. A transmission system according to claim 5, said registering member comprising a plurality of successive stages of auxiliary relays, the contacts of the relays of each said stage being connected directly to the armatures of the relays of the next stage and also being connected through a delay network causing a delay whose magnitude is less than the duration of an undistorted signal, to the windings of the said auxiliary relays of the next stage, the relay of the first stage being connected to the incoming line which delivers signals to be pre-distorted, through a network causing a delay whose magnitude is equal to a fraction of the duration of one undistorted signal, so that the relay of the first said stage assumes a position which depends on the polarity of the last signal received before the signal to be pre-distorted, the relays of the second of said stages assuming a position which depends on the polarity of the next to the last signal received before the signal to be pre-distorted, said relation being repeated cyclically.

11. A transmission system according to claim 10, said selector member comprising a plurality of marking relays having one end of their windings connected to a common point, and the other ends of their windings being connected to the contacts of the registering relays of the last said stage, and a current source connected to the armature of the first registering relay and also being connected to the common point of the windings of the marking relays, whereby to each combination of the positions of the armatures of the registering relays there corresponds the energization of a determined marking relay.

12. A system according to claim 5, said retarding device comprising inserted in series with the winding of the retransmitting relay, a plurality of retarding networks connected in series, being in number equal to the number of combinations of different signals capable of being marked by the registering member, each of said networks being furthermore connected to an operated position contact of one of the marking relays of the selector member and also being connected to the armature of the said relay, so as to become short-circuited when the said relay is energized.

13. A system according to claim 5, said selector member comprising a certain number of bridge rectifier units, each said bridge rectifier unit having one of its corners connected to the terminal of the registering member to which is applied the polarity potential of one of the registered signals, and the opposite corner of said unit being connected to the terminal of the registering member to which is applied the polarity potential of the following registered signal, the two other corners of each said bridge unit being connected to a marking relay whose contacts are connected to one of the sections of the retarding device, and whose armature is connected to the winding of the retransmitting relay whereby if the polarities of two successive signals are different, the corresponding marking relay is energized, and the corresponding section of the retarding device is inserted in the circuit between the transmitting device and the retransmitting relay, and inversely.

HONORÉ MARCEL BAYARD.
RAYMOND JACQUES CHARLES ROQUET.

No references cited.